US012681480B2

(12) United States Patent
Christensen et al.

(10) Patent No.: US 12,681,480 B2
(45) Date of Patent: Jul. 14, 2026

(54) AUTOMATIC LOW-SPEED AIRCRAFT MANEUVER WIND COMPENSATION

(71) Applicant: Textron Innovations Inc., Providence, RI (US)

(72) Inventors: Kevin Thomas Christensen, Plano, TX (US); Sang Gyun Park, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 106 days.

(21) Appl. No.: 17/578,058

(22) Filed: Jan. 18, 2022

(65) Prior Publication Data

US 2023/0229173 A1 Jul. 20, 2023

(51) Int. Cl.
*G05D 1/00* (2024.01)
*G01P 5/00* (2006.01)
(52) U.S. Cl.
CPC ............... *G05D 1/106* (2019.05); *G01P 5/00* (2013.01)
(58) Field of Classification Search
CPC ......... G05D 1/106; G05D 1/0204; G01P 5/00
See application file for complete search history.

(56) References Cited

U.S. PATENT DOCUMENTS

| | | | |
|---|---|---|---|
| 8,099,202 B1 * | 1/2012 | Krenz | .................. G01C 23/005 701/16 |
| 9,377,784 B2 | 6/2016 | Kowalski et al. | |
| 2003/0106958 A1 * | 6/2003 | Gold | .................... G05D 1/0858 244/17.13 |

| | | | |
|---|---|---|---|
| 2008/0243372 A1 * | 10/2008 | Bodin | .................. G05D 1/0027 701/23 |
| 2008/0249672 A1 * | 10/2008 | Cherepinsky | ........ G05D 1/0858 701/4 |
| 2014/0095001 A1 * | 4/2014 | Cherepinsky | ........... B64C 19/00 701/3 |
| 2016/0026190 A1 * | 1/2016 | Kowalski | ............ B64C 29/0033 701/7 |
| 2017/0121011 A1 * | 5/2017 | Lax | ....................... G05D 1/0005 |
| 2019/0056753 A1 * | 2/2019 | Worsham, II | ........... B64C 27/57 |

(Continued)

FOREIGN PATENT DOCUMENTS

| | | | |
|---|---|---|---|
| CN | 112135776 A | * 12/2020 | ............. B64U 10/10 |

OTHER PUBLICATIONS

Machine translation of CN 112135776 A, Dec. 25, 2020, pp. 1-24 (Year: 2024).*

(Continued)

*Primary Examiner* — Anne Marie Antonucci
*Assistant Examiner* — Jared C Bean
(74) *Attorney, Agent, or Firm* — Fogarty LLP

(57) ABSTRACT

Automatic low-speed aircraft maneuver wind compensation is implemented by an aircraft flight control system flight control computer (FCC) configured to receive or retrieve steady wind data and retrieve groundspeed data for the aircraft. The FCC computes two-dimensional relative horizontal airspeed (i.e., horizontal relative to the surface of the earth) for the aircraft, using the steady wind data and the groundspeed data for the aircraft, and computes relative changes in trim controls of the aircraft using the two-dimensional relative horizontal airspeed of the aircraft. The resulting relative changes in controls of the aircraft due to relative horizontal airspeed changes are applied to flight element control actuators.

9 Claims, 6 Drawing Sheets

(56) References Cited

U.S. PATENT DOCUMENTS

| 2021/0318697 | A1* | 10/2021 | Tehrani | ................. | G05D 1/106 |
| 2022/0227488 | A1* | 7/2022 | Brand | ................... | B64C 27/82 |
| 2022/0341753 | A1* | 10/2022 | Wang | ................... | G01C 21/20 |

OTHER PUBLICATIONS

NASA webpage for Relative Velocities with a Ground Reference, 2021: https://www.grc.nasa.gov/www/k-12/airplane/move.html (Year: 2024).*
Machine translation of the description CN-112135776-A, Li et al., Dec. 25, 2020 (Year: 2025).*

\* cited by examiner

AUTOMATIC LOW-SPEED AIRCRAFT MANEUVER WIND COMPENSATION

STATEMENT REGARDING FEDERALLY SPONSORED RESEARCH OR DEVELOPMENT

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD

The present disclosure relates generally to aircraft, and specifically to automatic low-speed aircraft maneuver wind compensation.

BACKGROUND

Winds and relative horizontal airspeeds have a substantial impact on rotorcraft, or other vertical take-off and landing (VTOL) (or vertical/short take-off and landing (VSTOL)) aircraft, performance and controllability during low-speed maneuvering. Pilots have a general knowledge of the control inputs needed for changes in horizontal airspeed relative to the surface of the earth and have learned to compensate for known winds during maneuvers. However, often the winds are not accurately known. Both piloted and automated control systems compensate for changes in relative horizontal speeds by rejecting disturbances from the desired vertical and horizontal flightpath. This reactive approach degrades the precision of low-speed maneuvers, such as hover-type maneuvers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide automatic low-speed aircraft maneuver wind compensation in an aircraft having a plurality of flight control elements and a plurality of actuators driving the flight control elements. Therein, an aircraft flight control system flight control computer (FCC) is configured to receive or retrieve steady wind data comprising wind speed and wind direction in an operational area of the aircraft and retrieve groundspeed data for the aircraft comprising groundspeed and direction of the aircraft. The FCC may receive or retrieve the steady wind data from one or more onboard aircraft airspeed data sensors, and/or receive the steady wind data through a datalink to the aircraft FCC.

The FCC computes two-dimensional relative horizontal airspeed (i.e., horizontal relative to the surface of the earth) for the aircraft, using the steady wind data and the groundspeed data for the aircraft, such as by combining the steady wind data and the groundspeed data for the aircraft. The FCC then computes relative changes in trim controls of the aircraft using the two-dimensional relative horizontal airspeed of the aircraft. For example, where the trim controls of the aircraft include aircraft rotor controls, aircraft attitude controls, power controls, and/or the like, the FCC may compute the relative changes in the trim controls of the aircraft using the two-dimensional relative horizontal airspeed of the aircraft to look up the relative changes in the trim controls of the aircraft in aircraft attitude, power, and/or rotor actuator control two-dimensional lookup tables. Additionally, the FCC may compute the relative changes in controls of the aircraft based, at least in part, on existing aircraft loading and ambient conditions The resulting relative changes in controls of the aircraft due to relative horizontal airspeed changes are applied to flight element control actuators. For example, the FCC may apply the relative changes in controls of the aircraft through direct feed forward or by performing an integration on a trim control rate. The FCC may, in some aspects account for wind gusts by disturbance rejection through feedback loops.

In various embodiments, one or more of the techniques described herein may be performed by one or more computer systems (e.g., a flight control computer). In other various embodiments, a tangible computer-readable storage medium may have program instructions stored thereon that, upon execution by one or more computer systems (e.g., a flight control computer) cause the one or more computer systems to execute one or more operations disclosed herein. In yet other various embodiments, one or more systems (e.g., a flight control computer) may each include at least one processor and memory coupled to the processors, wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
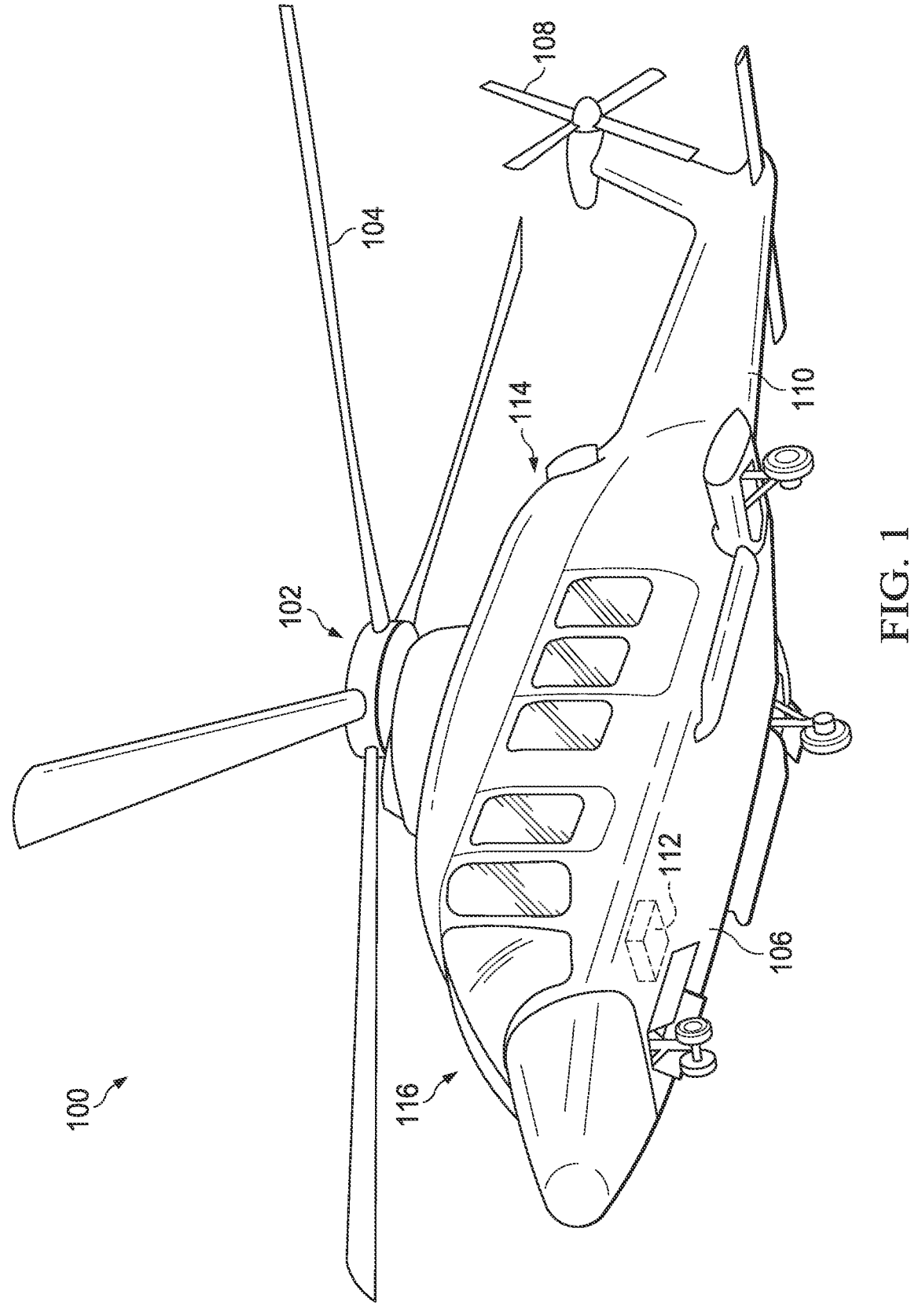

Having thus described the invention in general terms, reference will now be made to the accompanying drawings, which are not necessarily drawn to scale, and which are incorporated in and form part of the specification and in which like numerals designate like parts, illustrate embodiments of the present invention and together with the description, serve to explain the principles of the invention. In the drawings:

FIG. 1 illustrates a rotorcraft, wherein embodiments of the present systems and methods may be implemented, according to some embodiments.

Figure 2:
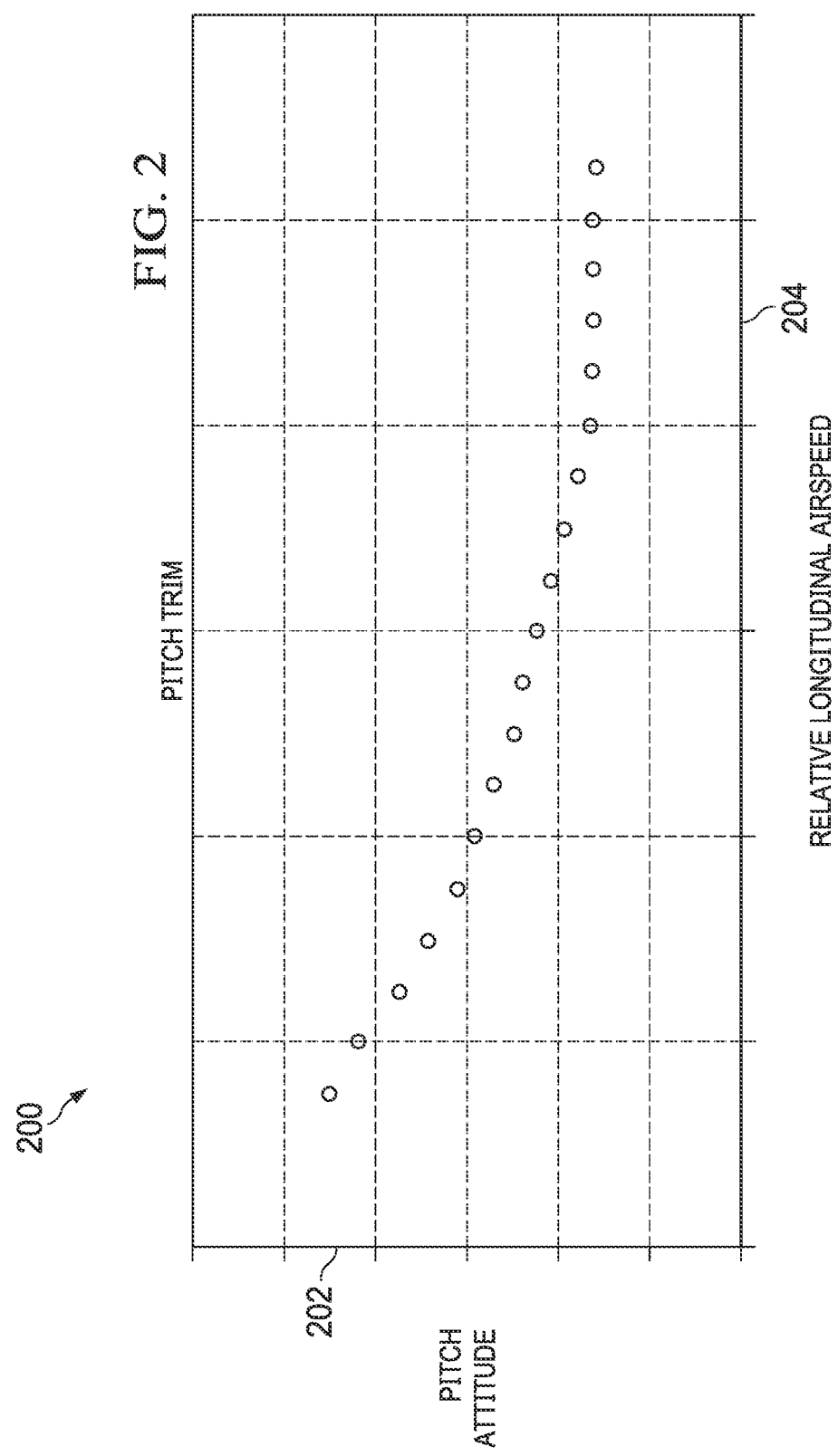
Figure 3:
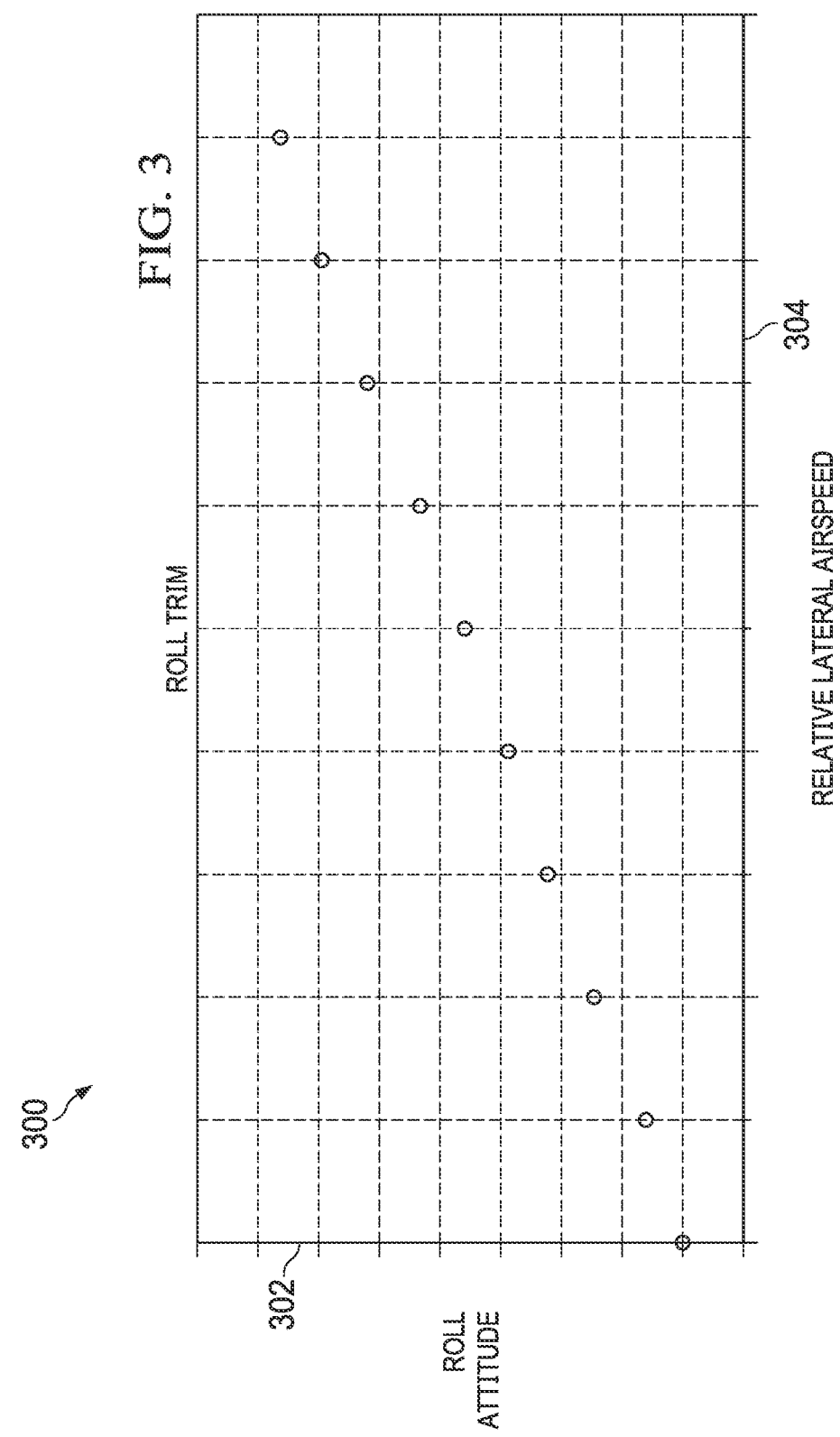
Figure 4:
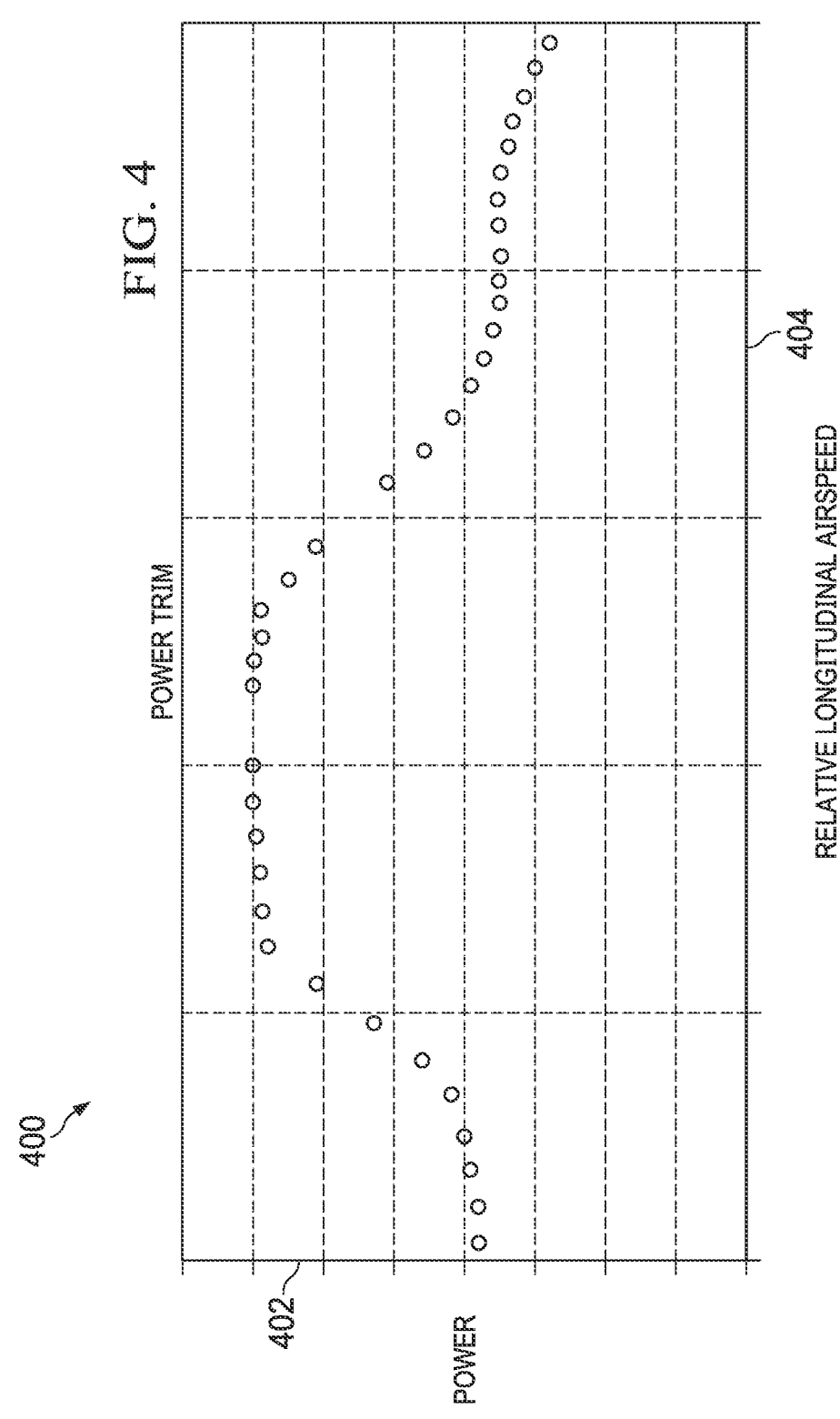
Figure 5:
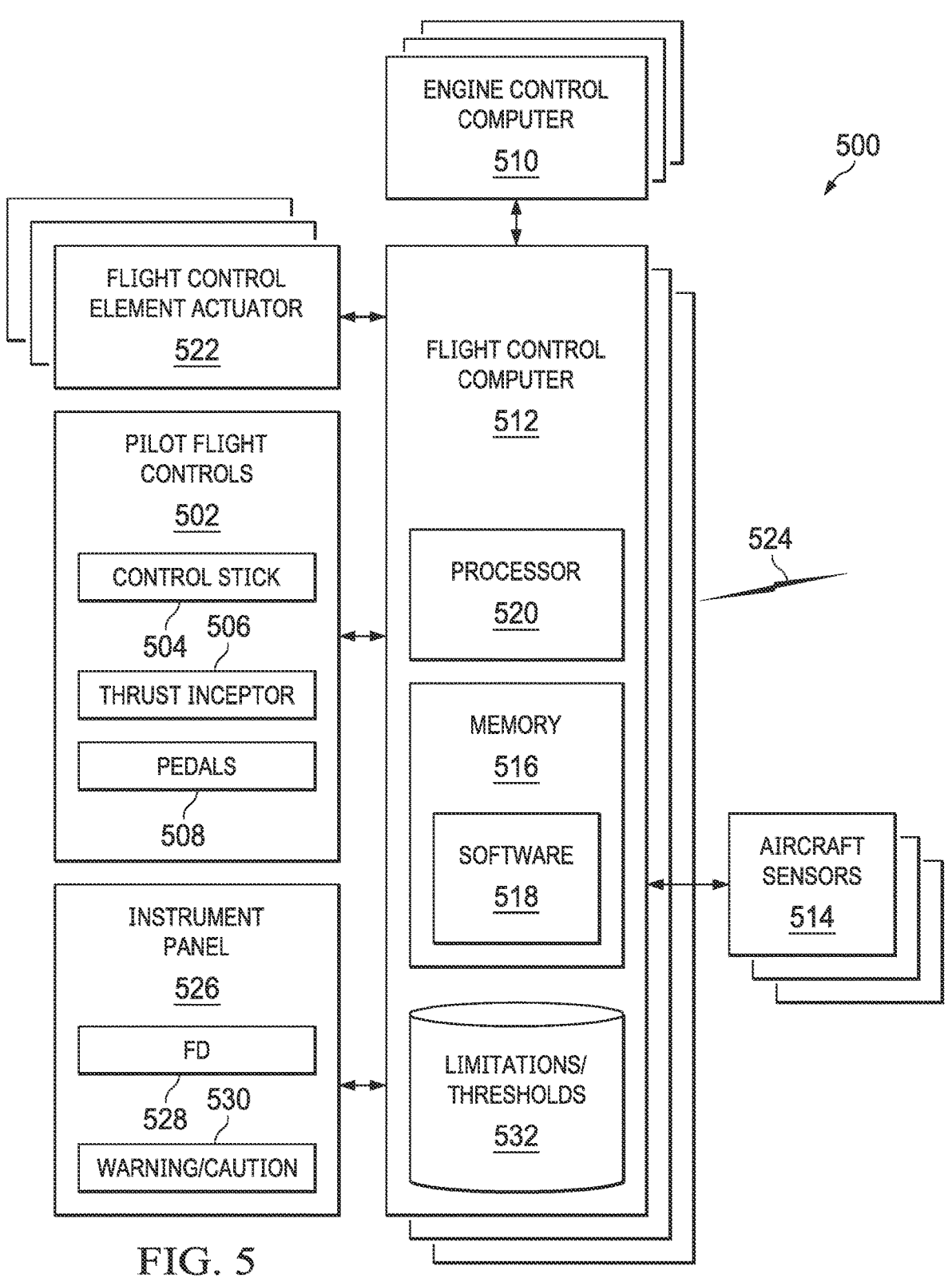
Figure 6:
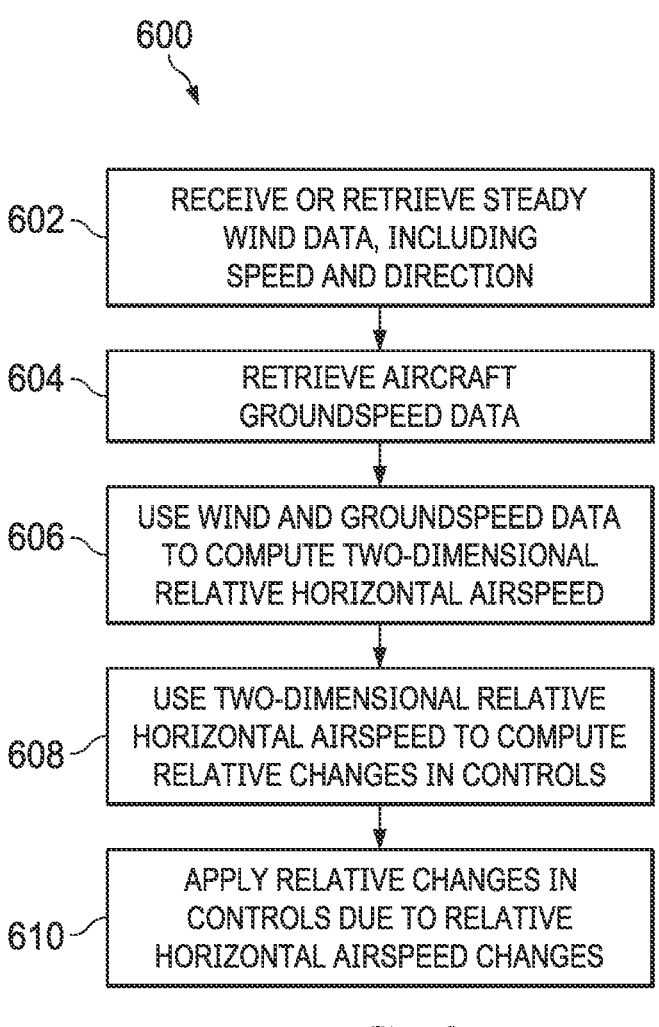

FIG. 2 is a representative low-speed maneuver pitch trim plot for an aircraft;

FIG. 3 is a representative low-speed maneuver roll trim plot for an aircraft;

FIG. 4 is a representative low-speed maneuver power trim plot for an aircraft;

FIG. 5 is a block diagram of an example fly-by-wire flight control system, for a rotorcraft, or other vertical take-off and landing (VTOL) aircraft, wherein embodiments of the present systems and methods may be implemented, according to some embodiments; and FIG. 6 is a flowchart of an example implementation of automatic low-speed aircraft maneuver wind compensation, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, although embodiments of the present systems and methods may be described below with reference to rotary wing and/or tiltrotor aircraft, embodiments of the present systems and methods may be applicable to various types of aircraft, including not only rotary wing and tiltrotor aircraft, but also fixed wing aircraft, and the like, particularly those capable of hover-type maneuvers, such as hover, vertical take-off and landing (VTOL) (or vertical/short take-off and landing (VSTOL)), etc.

Although, as noted, winds and relative horizontal airspeeds have a substantial impact on the performance and controllability of rotorcraft, or other VTOL aircraft, during low-speed maneuvering, and reactive approaches to such impacts degrade the precision of low-speed maneuvers, automatic wind compensation has not typically been integrated into rotorcraft, or other aircraft.

Embodiments of the present systems and methods relate generally to aircraft, and specifically to automatic low-speed aircraft maneuver wind compensation, such as during hover-type maneuvers. Embodiments of the present automatic low-speed aircraft maneuver wind compensation systems and methods improve precision during low-speed maneuvers by automatically adjusting trim controls for changes in relative horizontal airspeed. As used herein, "horizontal airspeed" is relative to the earth's surface, as opposed to vertical speed which would be into or away from the earth's surface.

In accordance with embodiments of the present systems and methods, automatic low-speed aircraft maneuver wind compensation may be implemented by an aircraft flight control system aircraft flight control computer (FCC) configured to receive or retrieve steady wind data and retrieve groundspeed data for the aircraft. The FCC computes two-dimensional relative horizontal airspeed (i.e., horizontal relative to the surface of the earth) for the aircraft, using the steady wind data and the groundspeed data for the aircraft, and computes relative changes in controls of the aircraft using the two-dimensional relative horizontal airspeed of the aircraft. The resulting relative changes in controls of the aircraft due to relative horizontal airspeed changes are applied to flight element control actuators.

FIG. 1 illustrates rotorcraft 100, wherein embodiments of the present systems and methods may be implemented, according to some embodiments. However, as described below, embodiments of the present systems and methods may be implemented in fixed wing aircraft, tiltrotor aircraft, etc. Rotorcraft 100 has a main rotor system 102 with a plurality of rotor blades 104. The pitch of rotor blades 104 can be collectively and cyclically manipulated to selectively control direction, thrust, and lift of rotorcraft 100. For example, the pitch of each main rotor blade 104 may be controlled by a swashplate in order to selectively control the attitude, altitude, and movement of the rotorcraft 100. The swashplate may be used to collectively and/or cyclically change the pitch of the main rotor blades. Rotorcraft 100 includes fuselage 106, anti-torque system 108, and an empennage 110. Anti-torque system 108 may include a tail rotor, no-tail-rotor (NOTAR), or dual main rotor system. In rotorcraft with a tail rotor, the pitch of each tail rotor blade is collectively changed in order to vary thrust of the anti-torque system, providing directional control of the rotorcraft 100. The pitch of the tail rotor blades is changed by one or more tail rotor actuators. In accordance with embodiments of the present systems and methods, a flight control system 112, such as a fly-by-wire system, sends electrical signals to the main rotor actuators or tail rotor actuators to control flight of rotorcraft 100. Fly-by-wire system 112 assists pilots in stably flying rotorcraft 100 and to reduce workload on the pilots.

Power is supplied to the main rotor system 102 and the anti-torque system 108 by one or more engines or motors 114. The engines 114 may be controlled according to signals from the fly-by-wire system 112. The output of the engine 114 is provided to a driveshaft that is mechanically and operatively coupled to the main rotor system 102 and the anti-torque system 108 through a main rotor transmission and a tail rotor transmission, respectively.

The empennage 110 may have other flight control devices such as horizontal or vertical stabilizers, rudder, elevators, or other control or stabilizing surfaces that are used to control or stabilize flight of the rotorcraft 100. The fuselage 106 includes a cockpit 116, which includes displays, controls (e.g., control stick, thrust inceptor, pedals, etc.), and instruments. In some embodiments, cockpit 116 is configured to accommodate a pilot or a pilot and co-pilot. It should be appreciated that even though rotorcraft 100 is depicted as having certain illustrated features, the rotorcraft 100 may have a variety of implementation-specific configurations. For instance, it is also contemplated, however, that rotorcraft 100 may be operated remotely, in which case cockpit 116 could be configured as a fully functioning cockpit to accommodate a pilot (and possibly a co-pilot as well) to provide for greater flexibility of use or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 100 could be configured as an unmanned vehicle, in which case cockpit 116 could be eliminated entirely in order to save space and cost.

The fly-by-wire system 112 may provide different control characteristics or responses for control stick, thrust inceptor, or pedal control input in the different flight regimes. Fly-by-wire system 112 may be implemented in one or more FCCs disposed between pilot controls in cockpit 116 and flight control systems. The FCC interprets the flight commands and signals actuators that control the main rotor system 102 and the anti-torque system 108 as well as the angle of attack of main rotor blades 104 and the tail rotor blades. Such actuators may be mechanically, electrically, pneumatically, and/or hydraulically driven and may be controlled by electrical command signals from the FCC. The FCC provides corrections to flight controls that assist in operating the rotorcraft more efficiently or that put the rotorcraft into a stable flight. The fly-by-wire systems in rotorcraft 100 may, for example, automatically adjust power output by the engine to match a thrust inceptor input, apply collective or power correction during a stick control input, provide automation of one or more flight control procedures, provide for default or suggested control positioning, or the like.

FIG. 2 is a representative low-speed maneuver pitch trim plot 200 for an aircraft. This plot graphs aircraft pitch attitude 202 versus relative longitudinal airspeed 204 of the aircraft. As noted, the aircraft FCC(s) may have one or more processors and a memory, wherein the memory stores instructions for executing aircraft control laws (CLAWs) and embodiments of the present systems and methods for automatic low-speed aircraft maneuver wind compensation by leveraging the CLAWs to provide automatic low-speed aircraft maneuver wind compensation, such as in the manner discussed in greater detail below. For example, with respect to FIG. 2, an aircraft FCC may control aircraft effectors in accordance with embodiments of the present systems and methods for automatic low-speed aircraft maneuver wind compensation to set the pitch of the aircraft at the pitch trim setting for the corresponding relative longitudinal airspeed, such as in the manner discussed in greater detail below.

FIG. 3 is a representative low-speed maneuver roll trim plot 300 for an aircraft. This plot graphs aircraft roll attitude 302 versus lateral relative airspeed 304 of the aircraft. In accordance with embodiments of the present systems and methods, an aircraft FCC may leverage aircraft CLAWs to control aircraft effectors to provide automatic low-speed aircraft maneuver wind compensation to set the roll of the aircraft at the roll trim setting for the corresponding relative lateral airspeed, such as in the manner discussed in greater detail below.

FIG. 4 is a representative low-speed maneuver power trim plot 400 for an aircraft. This plot graphs aircraft power 402 versus relative longitudinal airspeed 404 of the aircraft. In accordance with embodiments of the present systems and methods, an aircraft FCC may leverage aircraft CLAWs to control aircraft effectors to provide automatic low-speed aircraft maneuver wind compensation to set the power to the power trim setting for the corresponding relative longitudinal airspeed, such as in the manner discussed in greater detail below.

Thus, as one of skill in the art will appreciate, with respect to FIGS. 2 through 4, if there is some relative change in horizontal airspeed on an aircraft operating at low speed, the pitch attitude, roll attitude, and/or power will need to be changed in order to maintain the aircraft in trimmed flight. For example, as shown in FIG. 2, if an aircraft accelerates longitudinally from hover and stabilizes at a new relative longitudinal airspeed, pitch attitude will need to be adjusted. Similarly, as shown in FIG. 3, if an aircraft accelerates laterally from hover and stabilizes at a new relative lateral airspeed, roll attitude will need to be adjusted. Such adjustments may particularly come into play when the aircraft is turned during hover in a wind as relative longitudinal airspeed is converted to lateral airspeed, or vice versa. In another example, as shown in FIG. 4, when relative longitudinal airspeed changes, aircraft power will need to be adjusted.

FIG. 5 is a block diagram of example fly-by-wire flight control system 500 (e.g., fly-by-wire system 112 of FIG. 1) for an aircraft, such as may implement the present systems and methods for automatic low-speed aircraft maneuver wind compensation, according to some embodiments. A pilot may manipulate one or more pilot flight controls 502 in order to control flight of the aircraft. Example fly-by-wire flight control system 500 of FIG. 5 shows flight controls, which may variously be referred to as "inceptors," for a rotorcraft, which may include manual controls such as control stick 504, thrust inceptor 506, and pedals 508, however, as noted, various embodiments of the present systems and methods for automatic low-speed aircraft maneuver wind compensation may be implemented, not only in rotorcraft, including tiltrotor aircraft, but also other VTOL aircraft. Inputs provided by the pilot to the pilot flight controls 502 may be transmitted mechanically and/or electronically (e.g., via the fly-by-wire flight control system) to flight control elements (effectors) by flight control system 500. Flight control elements may represent devices operable to change the flight characteristics of the aircraft. Flight control elements on the aircraft may include mechanical and/or electrical systems operable to change the positions or angle of attack of rotor blades in a rotorcraft, or lift surfaces in a fixed wing aircraft, or to change the power output of aircraft engine(s), for example. Flight control elements include systems such as a swashplate, tail rotor actuator, and the like in a rotorcraft, and systems operable to control the aircraft engine(s). The flight control system 500 may adjust the flight control elements independently of the flight crew in order to stabilize the aircraft, reduce workload of the flight crew, and the like. The flight control system 500 includes engine control computers (ECCUs) 510, FCC(s) 512, and aircraft sensors 514, which collectively adjust the flight control elements, and may implement portions of embodiments of the present automatic low-speed aircraft maneuver wind compensation.

Flight control system 500 has one or more FCC(s) 512. In some embodiments, multiple FCC(s) 512 are provided for redundancy, modes of operation, and/or the like. One or more modules within FCC(s) 512 may be partially or wholly embodied as software and/or hardware for performing any functionality described herein. For example, FCC(s) 512 may comprise memory 516, including non-transitory medium for storing software 518, and one or more processors 520 for executing instructions of software 518. Memory 516 in some embodiments is a memory system that includes both transitory memory such as Random-Access Memory (RAM) and non-transitory memory such as, Read-Only Memory (ROM), Electrically Erasable Programmable ROM (EEPROM), Flash-EEPROM, magnetic media including disk drives, optical media, etc. Memory 516 stores software 518 as machine readable instructions executable by processor(s) 520. FCC 512 is configured to control aircraft effectors in response to aircraft CLAWs. Memory 516 stores instructions for executing the aircraft CLAWs.

ECCUs 510 control the aircraft engine(s). For example, ECCUs 510 may vary the output power of the aircraft engine(s) to control the rotational speed of the main rotor blades, or the tail rotor blades, in the illustrated rotorcraft example of FIG. 5. ECCUs 510 may control the output power of the engine(s) according to commands from FCC(s) 512, or may do so based on feedback such a measured revolutions per minute (RPM) of the main rotor blades, in the illustrated example of FIG. 5.

FCC(s) 512 may analyze pilot inputs and dispatch corresponding commands to flight control elements such as ECCUs 510, aircraft flight control element actuators 522 (e.g., a tail rotor actuator, actuators for the swashplate, or the like in a rotorcraft) or other components used to control operation of the aircraft. Further, FCC(s) 512 are configured and receive input commands from the pilot controls through sensors associated with each of pilot flight controls 502. The input commands are received by measuring the positions of pilot controls 502. FCC(s) 512 may also receive input from sensors 514, such as, in accordance with embodiments of the present systems and methods for automatic low-speed aircraft maneuver wind compensation, wind data (speed and direction), as discussed in greater detail below. Alternatively, or additionally, FCC(s) 512 may receive such wind data input from an offboard source, such as via (wireless) datalink 524. FCC(s) 512 also display information in instruments on, for example, an instrument panel 526, control tactile cueing commands to pilot controls 502, and the like.

Aircraft sensors 514 are in communication with FCC(s) 512. Aircraft sensors 514 may include sensors for measuring a variety of aircraft systems, flight parameters, environmental conditions, and the like. For example, aircraft sensors 514 may include sensors for measuring wind speed and direction, airspeed, yaw rate, ground speed, attitude, altitude, position, orientation, vertical speed, temperature, and the like, such as in accordance with embodiments of the present systems and methods, as discussed in greater detail below. Thereby, sensors 514, such as in conjunction with FCC(s) 512, may determine aircraft operational limits such as stall, load factors, crosswind limits, vortex ring state, critical azimuth, drive system range limits, engine limits, and/or the like, also such as in accordance with embodiments of the present systems and methods, as also discussed in greater detail below. Other aircraft sensors 514 could include sensors relying upon data or signals originating external to the aircraft, such as wind speed and direction sensors, a global positioning system (GPS) sensor, a VHF Omnidirectional Range sensor, Instrument Landing System (ILS), and the like, and transmitted to the FCC(s) 512, such as via datalink 524.

In some embodiments, instrument panel 526 includes a flight management system (FMS). The FMS may include a GPS, a mapping system, a navigation system, or other types of systems. A flight director system ("FD") 528 may further include a display that can be used to provide information to the pilot. In some embodiments, FD 528 may be configured to send signals representing flight control targets to FCC(s) 512 and may be configured to receive coupling logic signals from FCC(s) 512. In some cases, some aircraft sensors 514 are part of or connected to FD 528. FD 528 and FCC(s) 512 may be able to send or receive other signals than sensor signals, such as target error signals, command signals, or other types of signals. In some embodiments, FD 528 is communicatively coupled to the FCC(s) by a communications bus such as a serial bus, a CAN bus, or another type of wired or wireless communication system. In some embodiments, FD 528 includes an autopilot function that provides automatic flight control for the aircraft.

Instrument panel 526 may also provide warning, caution, and advisory indications 530 to the pilot. Warning and caution indications 530 may include, for example, text alerts on a display, lights (e.g., master caution and fire lights), an annunciator panel, aural warnings (e.g., bells, chimes, and tones), spoken warnings, and other indicators. Other warning, caution, and advisory indications provided to the pilot may include tactile feedback, such as, stick, yoke, thrust inceptor, or pedal shakers, and/or other indicators. FCC(s) 512 may determine that the aircraft is approaching or in an unsafe condition and may trigger an appropriate warning or caution indicator 530, or tactile feedback, to notify the pilot of that condition. For example, FCC(s) 512 may monitor a database of certain aircraft performance limitations and thresholds 532. When an aircraft status or flight condition reaches or approaches a limitation or threshold in database 532, FCC(s) 512 can provide an indication to the pilot via warnings and cautions 530, and/or provide tactile feedback, to alert the pilot of that condition.

In the illustrated example of FIG. 5, rotorcraft control stick 504 may be connected to one or more stick position sensors, one or more stick detent sensors, and one or more stick actuators or stick trim motors. Stick position sensors measure the position of control stick 504. Control stick 504 may be a single control stick (inceptor) that moves along two axes and permits a pilot to control pitch, which is the vertical angle of the nose of the rotorcraft, and roll, which is the side-to-side angle of the rotorcraft. The stick position sensors generate roll and pitch signals that are sent to FCC(s) 512, which controls (a) rotorcraft swashplate(s), the engine(s), a tail rotor, and/or (other) related flight control devices.

In the illustrated example of FIG. 5, rotorcraft thrust inceptor 506 may have one or more inceptor position sensors, one or more inceptor detent sensors, and one or more inceptor actuators or inceptor trim motors. Thrust inceptor position sensors measure the position of thrust inceptor 506. Thrust inceptor 506 may be a single inceptor that moves along a single axis or with a lever type action. The thrust inceptor position sensor detects the position of inceptor 506 and sends an inceptor position signal to FCC(s) 512, which controls the aircraft engine(s), swashplate actuators, or related flight control devices according to a thrust inceptor position signal to control the vertical movement of the aircraft at low speed. In some embodiments, FCC(s) 512 may send a power command signal to ECCUs 510 and a collective command signal to the rotorcraft's main rotor or swashplate actuators so that the angle of attack of the main blades is raised or lowered collectively, and the engine power is set to provide the needed power to keep the main rotor RPM substantially constant.

Pedals 508 may have one or more pedal sensors that detect the position of pedals 508 and sends a pedal position signal to FCC(s) 512, which, in the illustrated example of FIG. 5, controls the tail rotor blades, to cause the aircraft to yaw, or rotate around a vertical axis. The pedal sensor detects the position of pedals 508 and sends a pedal position signal to FCCs 512, which controls the tail rotor to cause the rotorcraft to yaw or rotate around a vertical axis. In some embodiments, pedal assembly 508 is free of a trim motor or actuator and may have a mechanical return element that centers the pedals when the pilot releases the pedals. In other embodiments, the pedal control assembly may have one or more trim motors, or the like.

Depending upon the type and model of the aircraft, the aircraft may have other flight control input apparatuses to provide pilot input to the flight control system. For example, a 3-axis sidestick controller (inceptor) may also incorporate yaw control commonly operated by foot pedals.

A person of skill in the art will appreciate that fly-by-wire flight control system 500 is merely illustrative and is not intended to limit the scope of the disclosure described herein. In particular, the fly-by-wire flight control system 500 may include any combination of hardware and/or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other flight system configurations.

As noted above, FCC(s) 512 of fly-by-wire flight control system 500 for an aircraft may leverage the aircraft's CLAWs to provide automatic low-speed aircraft maneuver wind compensation, such as in the manner discussed in greater detail below. Therefore, the following description of the flowchart of FIG. 6 may refer back to FIGS. 1 through 5.

FIG. 6 is a flowchart of example implementation of automatic low-speed aircraft maneuver wind compensation 600, according to some embodiments. Therein, at 602, an aircraft flight control system (500), or more particularly aircraft FCC(s) 512 receive or retrieve steady wind data about the wind affecting the aircraft. This steady wind data may include, for example, wind speed, wind direction, and the like, in an operational area of the aircraft, such as in the vicinity of the aircraft. The steady wind data may be received or retrieved from one or more onboard aircraft airspeed data sensors (514), such as an onboard laser sensor, and/or received through a datalink (524), such as from a wind station at the location where the aircraft is operating, to the aircraft flight control system/computer. At 604, the aircraft flight control system or computer (500/512) may retrieve groundspeed data for the aircraft, which may, for example, include groundspeed and direction of the aircraft. This groundspeed data may be gathered from aircraft sensors (514) such as, by way of example, (a) GPS sensor(s), an internal navigation system (INS), inertial sensors, or the like.

At 606, the aircraft flight control system/computer (500/512) may compute (e.g., calculate) a two-dimensional relative horizontal airspeed (i.e., horizontal relative to the surface of the earth) for the aircraft, using the steady wind data captured at 602 and the groundspeed data for the aircraft captured at 604. For example, computing the two-dimensional relative horizontal airspeed for the aircraft at 606 may include combining the steady wind data gathered at 602 and the groundspeed data for the aircraft gathered at 604.

Then, at 608, the aircraft flight control system/computer (500/512) may compute (e.g., calculate) relative changes in controls of the aircraft using the two-dimensional relative horizontal airspeed of the aircraft calculated at 606. For example, computing the relative changes in controls of the aircraft at 608 may include computing relative changes in trim controls of the aircraft using the two-dimensional relative horizontal airspeed of the aircraft. Further, computation of the relative changes in the trim controls of the aircraft at 608 may use the two-dimensional relative horizontal airspeed of the aircraft to look up the relative changes in the trim controls of the aircraft in attitude, power, and/or rotor actuator control two-dimensional lookup tables, as discussed in greater detail below, and/or through other modeling, etc., such as may be maintained (as part of the aircraft's CLAWs) in (an) FCC database(es) (532). The trim controls of the aircraft employed in accordance with embodiments of the present systems and methods may include aircraft attitude controls, aircraft rotor controls, power controls, and/or the like. Such trim controls may include, by way of example, the same controls, such as flight control signals to flight element control actuators (522), as may be provided by a pilot, via an aircraft control stick (504), such as roll and pitch signals that are sent to the FCC(s) (512) to control (a) rotorcraft swashplate(s), the engine(s), a tail rotor, and/or (other) related flight control devices, as discussed above with respect to FIG. 5. Additionally, or alternatively, as needed, such trim controls may (also) include, by way of example, the same controls, such as flight control signals to flight element control actuators (522), as may be provided by a pilot, via an aircraft thrust inceptor (506), such as power signals to the FCC(s) (512) to control the aircraft engine(s), swashplate actuators, or related flight control devices to control the vertical movement of the aircraft, as discussed above with respect to FIG. 5. Further, such trim controls may, additionally, or alternatively include, by way of example, the same controls, such as flight control signals to flight element control actuators (522), as may be provided by a pilot, via aircraft control pedals (508), such as control signals to the tail rotor, to cause the aircraft to yaw, or rotate around a vertical axis, as discussed above with respect to FIG. 5.

The aircraft flight control system/computer (500/512) may, at 610, apply these relative changes in controls of the aircraft due to relative horizontal airspeed changes, including applying these relative changes in controls of the aircraft as the relative horizontal airspeed changes, such as may be sensed and computed by reiterative data collection (602 and 604) and calculations (606 through 608). This may apply the relative changes in controls of the aircraft through direct feed forward. Alternatively, or additionally, the rate the control trims are changing may be computed and an integration performed on this rate to compute where the trim controls should be to maintain trim conditions. Wind gusts may be accounted for by disturbance rejection through feedback loops. As noted, embodiments of the present systems and methods for wind compensation use the sensed or datalinked steady or average winds acting on the aircraft. Wind gusts which cause variations in wind speed and/or direction are typically accounted for in the CLAWs through disturbance rejection using feedback control loops to minimize feedback errors.

Embodiments of the present systems and methods for wind compensation are robust. For example, although the aircraft attitude, power, and/or rotor actuator control two-dimensional lookup tables are defined at a specific aircraft loading (gross weight (GW) and center of gravity (cg)) and ambient conditions (temperature and pressure altitude), the present wind compensation is robust, since relative horizontal airspeed changes will drive a relative change in trim controls (attitude, power, and control actuators). These trim changes will be relative to the trim conditions needed based on the existing aircraft loading and ambient conditions.

As noted, embodiments of the present systems and methods may be implemented in various types of aircraft, including not only in rotorcraft such as rotary wing and tiltrotor aircraft, but also in some fixed wing aircraft, for example, in VTOL (or vertical/short take-off and landing (VSTOL)) fixed wing aircraft, or the like, that employ thrust vectoring. Therein, the relative changes in trim controls of the aircraft are applied, such as at 610 above, to controls for such thrust vectoring.

Various elements of the present automatic low-speed aircraft maneuver wind compensation may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware.

Computer-based environment components may include programing and/or hardware to implement embodiments of the present systems and methods. This programming may take the form of stored program instructions, programed firmware, or the like, while hardware might take the form of an Application Specific Integrated Circuit (ASIC), or the like, to carry out such aspects of embodiments of the present systems and methods.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for automatic low-speed aircraft maneuver wind compensation comprising:

receiving or retrieving, by an aircraft flight control system, steady wind data comprising wind speed and wind direction in a current operational area of the aircraft through a datalink to the aircraft flight control system, the steady wind data obtained from a station at a location where the aircraft is operating;

retrieving, by the aircraft flight control system, groundspeed data for the aircraft comprising current groundspeed and direction of the aircraft;

computing, by the aircraft flight control system, a two-dimensional horizontal airspeed for the aircraft, using the steady wind data and the groundspeed data for the aircraft, wherein computing the two-dimensional horizontal airspeed for the aircraft further comprises combining the steady wind data and the groundspeed data for the aircraft;

computing relative changes in trim controls of the aircraft using the two-dimensional horizontal airspeed of the aircraft to look up the relative changes in a plurality of trim control two-dimensional lookup tables, each trim control two-dimensional lookup table defined at a different center of gravity of the aircraft relative to one another; and applying, by the aircraft flight control system, the relative changes in trim controls of the aircraft, due to horizontal airspeed changes, to flight element control actuators, wherein the trim controls of the aircraft comprise aircraft rotor controls, aircraft attitude controls, and/or power controls, and applying the relative changes in trim controls of the aircraft through direct feed forward, and applying disturbance rejection through feedback loops to account for wind gusts.

2. The method of claim 1, further comprising applying the relative changes in trim controls of the aircraft by performing an integration on a trim control rate.

3. The method of claim 1, wherein the steady wind data is received or retrieved from one or more onboard aircraft airspeed data sensors.

4. The method of claim 1, wherein the relative changes in trim controls of the aircraft are based, at least in part, on existing aircraft loading and ambient conditions.

5. An aircraft flight control system comprising:

an aircraft flight control computer configured to:

receive or retrieve steady wind data comprising wind speed and wind direction in a current operational area of the aircraft, the steady wind data obtained from a station at a location where the aircraft is operating through a datalink to the aircraft flight control system;

retrieve groundspeed data for the aircraft comprising current groundspeed and direction of the aircraft;

compute a two-dimensional horizontal airspeed for the aircraft, using the steady wind data and the groundspeed data for the aircraft, wherein computing the two-dimensional horizontal airspeed for the aircraft further comprises combining the steady wind data and the groundspeed data for the aircraft;

compute relative changes in controls of the aircraft using the two-dimensional horizontal airspeed of the aircraft to look up the relative changes in a plurality of trim control two-dimensional lookup tables, each trim control two-dimensional lookup table defined at a different center of gravity of the aircraft relative to one another; and apply the relative changes in controls of the aircraft, due to relative horizontal airspeed changes, to flight element control actuators aircraft, wherein the trim controls of the aircraft comprise aircraft rotor controls, aircraft attitude controls, and/or power controls, and applying the relative changes in trim controls of the aircraft through direct feed forward, and applying disturbance rejection through feedback loops to account for wind gusts.

6. The aircraft flight control system of claim 5, wherein the flight control computer is further configured to apply the relative changes in controls of the aircraft by performing an integration on a trim control rate.

7. The aircraft flight control system of claim 5, wherein the flight control computer is further configured to receive or retrieve the steady wind data from one or more onboard aircraft airspeed data sensors.

8. The aircraft flight control system of claim 5, wherein the flight control computer is further configured to compute the relative changes in controls of the aircraft based, at least in part, on existing aircraft loading and ambient conditions.

9. An aircraft comprising:

a plurality of flight control elements;

a plurality of actuators driving the flight control elements; and an aircraft flight control system comprising an aircraft flight control computer configured to:

receive or retrieve steady wind data comprising wind speed and wind direction in a current operational area of the aircraft, the steady wind data obtained from a station at a location where the aircraft is operating through a datalink to the aircraft flight control system;

retrieve groundspeed data for the aircraft comprising current groundspeed and direction of the aircraft;

compute a two-dimensional horizontal airspeed for the aircraft, using the steady wind data and the groundspeed data for the aircraft, wherein computing the two-dimensional horizontal airspeed for the aircraft further comprises combining the steady wind data and the groundspeed data for the aircraft;

compute relative changes in controls of the aircraft using the two-dimensional horizontal airspeed of the aircraft to look up the relative changes in a plurality of trim control two-dimensional lookup tables, each trim control two-dimensional lookup table defined at a different center of gravity of the aircraft relative to one another; and apply the relative changes in controls of the aircraft, due to relative horizontal airspeed changes, to the flight element control actuators, wherein the trim controls of the aircraft comprise aircraft rotor controls, aircraft attitude controls, and/or power controls; and applying the relative changes in trim controls of the aircraft through direct feed forward, and applying disturbance rejection through feedback loops to account for wind gusts.

* * * * *